Dec. 12, 1967 G. R. PLAMPER ET AL 3,357,715
MOWER HAVING WHEEL ADJUSTABLE MEANS
Filed Feb. 10, 1966 2 Sheets-Sheet 1

INVENTORS
GERHARD R. PLAMPER
BY GÜNTER F. PLAMPER
ATTORNEYS.

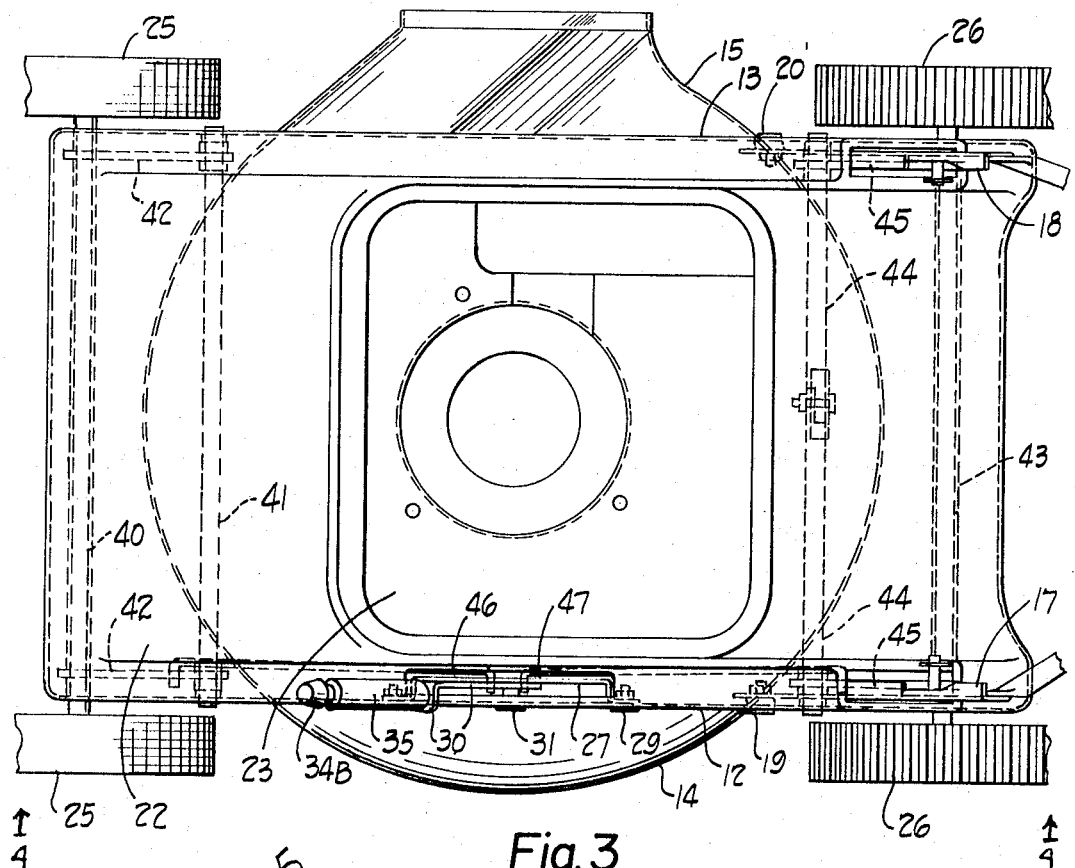

United States Patent Office 3,357,715
Patented Dec. 12, 1967

3,357,715
MOWER HAVING WHEEL ADJUSTABLE MEANS
Gerhard R. Plamper and Gunter F. Plamper, Cleveland, Ohio, assignors to The M. T. & D. Company, a corporation of Ohio
Filed Feb. 10, 1966, Ser. No. 526,424
8 Claims. (Cl. 280—43.13)

ABSTRACT OF THE DISCLOSURE

The wheels of a mower journalled on front and rear axle shafts extending laterally of the mower between the wheels are raised and lowered on the respective axle shafts relative to the body of the mower, by fore and aft pairs of bell crank arms splined on fore and aft pivot shafts, respectively, the bell crank arms on one side of the mower body being pivotally swingable in upright planes by longitudinally extending connecting rods which are so connected to an operating lever pivotally mounted on the mower tractor that swinging of the lever in one direction swings the bell crank arms to raise the axle shafts and respective wheels journalled thereon and in an opposite direction swings the bell crank arms to lower the axle shafts and respective wheels journalled thereon, the bell crank arms on the opposite side of the mower body being raised and lowered with the aid of force transmitted through the respective axle shafts.

---

Our invention relates to lawn mowers and the like having a housing and wheels for supporting the housing on the ground surface.

An object of our invention is to provide improved means for adjusting the elevation of the wheels relative to the housing supporting the wheels.

Another object is the provision of a control mechanism for simultaneously adjusting the position of the wheels relative to the housing so as to obtain the desired elevation of the housing above the ground surface engaged by the wheels.

Another object is the provision for obtaining concurrent adjustment of the elevated position of each wheel relative to the housing and for maintaining the wheels in the desired location.

Another object is the provision for quickly and easily varying the elevated position of the mower wheels relative to the housing by a simple and safe mechanism.

Other objects and a fuller understanding of our invention may be had by referring to the following description and claims, taken in conjunction with the accompanying drawings, in which:

FIGURE 3 is a plan view of the mower providing said preferred form of our invention, and with the motor removed from the housing for better illustration of the features of the invention;

FIGURE 4 is a side view of the mower shown in FIGURE 3, with the motor removed, and looking in the direction of the arrows 4—4 of FIGURE 3.

Figure 1:
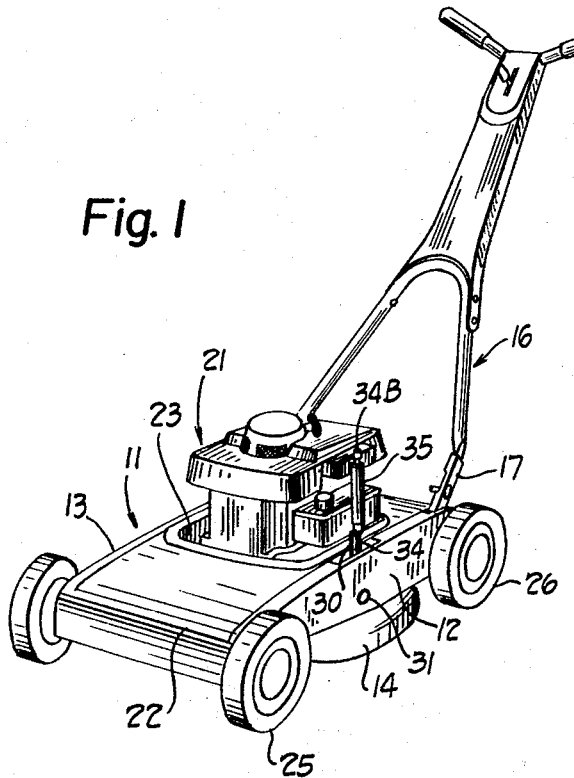
FIGURE 1 is a perspective view of a mower embodying the preferred form of our invention.

In the discussion of the invention there will sometimes be a reference to the change of the elevation of the wheels relative to the elevation of the housing. This, however, is an expression of convenience as it is to be understood that if the wheels are supported on a ground surface, then the elevation of the housing is changed relative to the elevation of the wheels as determined by the supporting ground surface.

The mower embodying features of our invention has a body or housing denoted generally by the reference character 11. Mounted upon this housing 11 is a usual engine or motor denoted generally by the reference character 21 which rotates a vertical shaft, which is turn revolves a blade in a horizontal plane in the usual manner. For simplicity of illustration, the shaft and the blade are not shown.

The housing 11 has a side wall 12 and a side wall 13 disposed parallel to each other on the opposite sides of the housing. Disposed below, and secured to the housing 11, is a hood 14 which surrounds the rotatable blade. This hood 14 has a usual discharge chute 15 on one side of the mower. Extending upwardly and rearwardly from the housing 11 is a handle member 16 used for the usual purpose of steering and controlling the mower. The lower spaced arms of the handle member 16 interfit with a lower extension member 17 and a lower extension member 18 carried by the housing and arranged to swing in parallel vertical planes upon the raising and lowering of the grips of the handle member 16.

A pair of front wheels 25 are journaled upon a front axle or wheel-carrying member 40. A pair of rear wheels 26 are journaled upon a rear wheel-carrying member or axle 43. The axles 40 and 43 are disposed parallel to each other and adjacent opposite ends of the housing 11. A shaft 41 is carried by the sides 12 and 13 of the housing 11 so as to permit rotation of the shaft 41 on its axis. Similarly, a shaft 44 is carried by the sides 12 and 13 of the housing 11 so as to permit rotation of the shaft 44 on its axis.

Carried by the shaft 41 adjacent its opposite ends and keyed thereto so as to swing upon rotation of the shaft 41 are a pair of spaced arm members 42. The arrangement is such that upon the swinging of one arm 42 on the axis of shaft 41, the other arm 42 simultaneously swings in unison therewith on the axis of shaft 41.

Carried by and keyed to the shaft 44 adjacent its opposite ends are two spaced arm members 45. The arrangement is such that upon the swinging of one arm member 45 on the axis of shaft 44, the other arm member 45 swings in unison therewith on the axis of shaft 44.

The arm member 42 on one side of the housing has a projection or short arm 42A extending angularly thereto so that the arm member 42 on that side forms in effect a bell crank. Also the arm member 45 on the same side of the mower housing has a projection or short arm 45A projecting at an angle thereto so that the arm member 45 on that side is in effect a bell crank.

Pivotally carried by the side 12 by means of pivot pin 31 is an actuating lever arm 30. This lever arm 30 extends upwardly through the housing so as to be accessible from the exterior of the housing and so as to be swingable in an arc. A nut 33 and washer 32 on the pivot pin 31 secures the lever arm 30 in position while permitting it to pivotally swing. At a point on the lever arm 30 above the axis of the pivot pin 31, a connecting rod 46 is secured thereto and extends forwardly to the projection or short arm 42A of the arm 42 on that side. The bent ends of the connecting rod 46 pivotally connects with the short arm 42A and with the lever arm 30 so as to permit relative swinging therebetween. Connected to the lever arm 30 at a point below the pivot pin 31 is a connecting rod 47 which is also connected with the short arm 45A on that side. The bent ends of the connecting rod 47 are pivotally connected to the lever arm 30 and short arm 45A so as to permit relative swinging therebetween.

Figure 5:
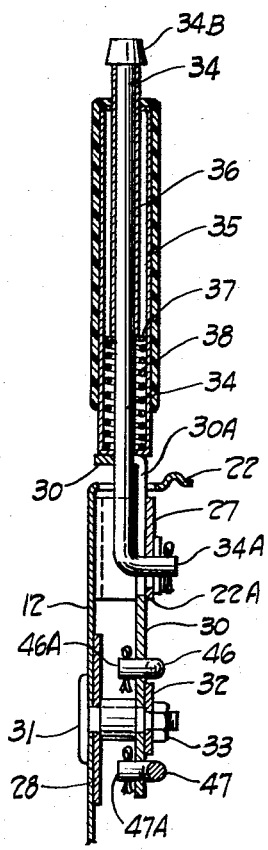
FIGURE 5 is an enlarged longitudinal sectional view taken through the line 5—5 of FIGURE 4.
Figure 2:
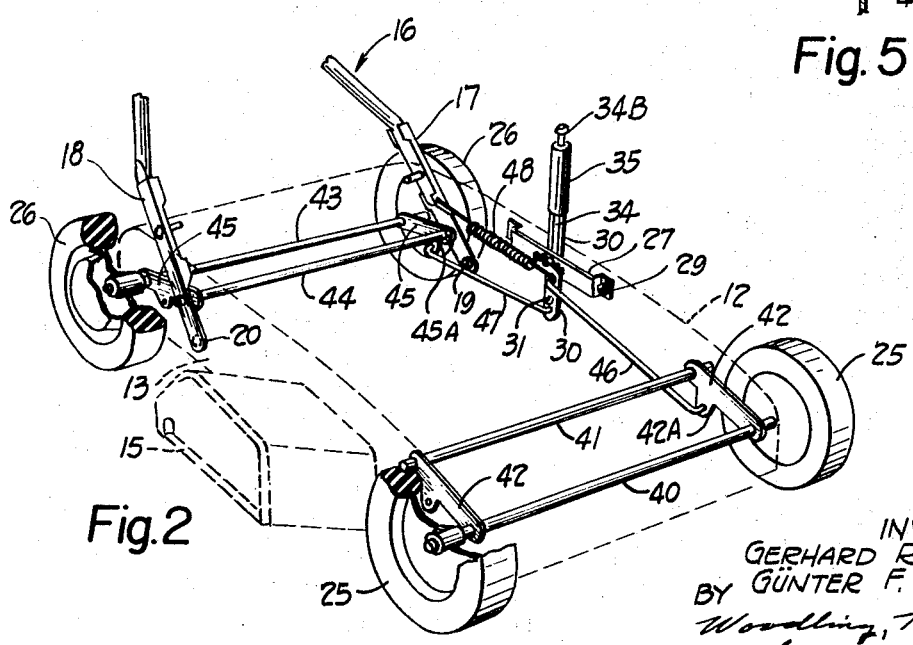
FIGURE 2 is a perspective view of a mower embodying our invention and with the housing shown in phantom form so as to better disclose the arrangement of the wheel-elevating mechanism therein.

A coil spring 48 interposed between the handle extension member 17 and the lever arm 30 is so biased as to urge the upper end of the lever arm 30 rearwardly toward the handle extension member 17. The housing 11 is provided with an upper deck 22 in which there is a central portion 23 accommodating the lower part of the engine 21. This central portion 23 has a rectangular outer wall extending therearound defining the area of the central portion. Secured to the side 12 of the housing is a bracket member 27, the bracket member 27 being secured at its opposite ends by fastenings 29. This bracket 27 together with the side 12 provides a longitudinal slot or guide-way in which the lever arm 30 may swing. A reinforcing plate 28 is disposed oppositely of the bracket 27 at the location of the pivot pin 31 as better seen in FIGURE 5. This bracket 27 has an arcuate slot 27A formed therein, which arcuate slot 27A is notched along the upper edge thereof to provide detent teeth therealong.

Extending axially of the lever arm 30 and protruding upwardly therefrom is a rod 34. The lower end of rod 34 has a bent lower end portion 34A which extends into the arcuate slot 27A and upon being urged upwardly engages with the notched upper edge thereof. Thus the bent lower end 34A provides a detent or pawl engageable by the adjacent teeth of the series of teeth making up the notched upper edge of slot 27A. The upper end of rod member 34 is provided with a button or enlarged end 34B which may be manually pressed downwardly by the operator desiring to manipulate the lever arm 30. Concentrically mounted around the rod member 34 above the lever arm 30 is a sleeve 35 adapted to be grasped by the hand of the operator. Within the sleeve 35 there is a smaller sleeve 36 also concentric with the rod 34. Mounted within the sleeve 35 and below the internal sleeve 36 is a coil spring 38 which is so disposed and arranged as to resiliently urge the rod 34 upwardly relative to the upper end of the lever arm 30. A washer 37 forms an abutment for the spring 38 in pressing upwardly on the internal sleeve 36. By the arrangement shown, the lever arm 30 may be pivotally swung upon the depression of the button 34B so as to disengage the lower end 34A from the teeth of the notched arcuate slot 27A. Upon disengagement of the portion 34A from the upper edge of the arcuate slot 27A, then the lever arm 30 may be freely swung to the desired location intermediate the limits provided by the ends of slot 27A. A longitudinal slot 30A in the lever arm 30 permits limited movement of the rod member 34 relative to the lever arm 30.

The handle extension members 17 and 18 are pivotally carried by the rear shaft 44 to permit limited swinging thereof in parallel vertical planes. A stop pin 19 carried by the lowermost end of extension member 17 is movable in an arcuate slot 24 formed in the side 12. This permits a limited swinging movement of the handle extension member 17 between the position shown in full lines and the position shown in broken lines in FIGURE 4. The handle extension member 18 has a similar stop pin 20 carried at its lowermost end which is swingable in a corresponding arcuate slot, not shown, in the opposite side 13.

To accommodate the raising and lowering of the wheels 25 and 26 relative to the housing 11, arcuate slots 49 and 50 are provided in the housing sides 12 and 13.

By the arrangement shown and described, it is seen that by manipulating the lever arm 30 through grasping the sleeve 35 and controlling the movement of the button 34B, the arm 30 may be positioned in any one of several positions between that shown in full lines and that shown in broken lines in FIGURE 4. This movement of the lever arm 30 in turn swings the front wheels 25 and rear wheels 26 upwardly and downwardly relative to the elevation of the housing 11. This relative elevation may be fixed by stopping the lever arm 30 at a desired position and releasing the button 34B so as to lock the lever arm 30 in fixed position. This in turn holds the wheels in fixed elevation relative to the housing. Of course, upon the wheels 25 and 26 being supported by the ground surface at a fixed location, the manipulation of the lever arm 30 and the consequent swinging of the arms 42 and 45 through the connecting rods 46 and 47 causes the whole housing 11 to be raised and lowered relative to the four wheels and the ground surface upon which they are supported. The arrangement provides for both convenience and safety in the rapid adjustment of the position of the wheels of a mower so as to raise or lower the housing and consequently the plane of the rotating blade relative to the grass to be cut by the blade revolving in its horizontal plane.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A mechanism for raising and lowering the wheels of a mower or the like relative to the elevation of the body of the same, said body having laterally spaced frame portions extending longitudinally thereof, comprising the combination of, a first support member carrying adjacent the opposite sides of the body a forward pair of wheels, said first support member including a first axle shaft extending laterally of said mower body between said forward wheels, and including a first pivot shaft journalled on said body to rotate on its axis relative to said body, said first axle shaft and said first pivot shaft being spaced apart and disposed parallel to each other, a second support member carrying adjacent the opposite sides of the body a rearward pair of said wheels, said second support member including a second axle shaft extending laterally of said mower body between said rearward wheels, and including a second pivot shaft journalled on said body to rotate on its axis relative to said body, said second axle shaft and second pivot shaft being spaced apart and disposed parallel to each other, a first pair of arm non-rotatively secured to said first pivot shaft at locations, respectively, adjacent oppositely spaced frame portions of the said body adjacent the forward end thereof, a second pair of arms non-rotatively secured to said second pivot shaft at locations, respectively, adjacent oppositely spaced frame portions of the said body adjacent the rearward end thereof, said arms of said pairs of arms being swingable in upright planes extending longitudinally of said body adjacent opposite sides thereof, said first pair of arms being connected to and carrying said first axle shaft adjacent opposite ends thereof to raise and lower the same and the forward pair of wheels carried thereby relative to said body upon the pivotal swinging of said first pair of arms in unison, said second pair of arms being connected to and carrying said second axle shaft adjacent opposite ends thereof to raise and lower the same and the rearward pair of wheels carried thereby relative to said body upon the pivotal swinging of said second pair of arms in unison, an actuating lever pivotally carried by said body and extending therefrom in position for the manual swinging of the free end of said actuating lever, first connecting means operatively connecting said actuating lever and an arm of said first pair of arms at a first point located at a distance from the axis of the first pivot shaft carrying said arm to cause said first pair of arms and the first support member, including said first axle shaft, connected thereto to swing in unison upon the pivotal swinging of said actuating lever, and second connecting means operatively connecting said actuating lever and an arm of said second pair of arms at a second point located at a distance from the axis of the second pivot shaft carrying said arm to cause said second pair of arms and the second support member, including said second axle shaft, connected thereto to swing in unison upon the pivotal swinging of said actuating lever, said first point being in a plane intermediate and parallel to said first pivot shaft and said first axle shaft, said second point being in a plane intermediate and parallel to said second pivot shaft and said second axle shaft, the interconnection of said first and second connecting means and said actuating lever relative to the pivot thereof being such that the first supporting member and forward wheels carried thereby and the second supporting member and rearward wheels carried thereby with the aid of force transmitted through the respective axle shafts carried by said first and second pairs of arms are simultaneously lowered relative to the said body upon the actuating lever being swung in one direction and are simultaneously raised relative to the said body upon the actuating lever being swung in an opposite direction, said first and second points of connections to the respective arms being located below a horizontal plane through the first and second pivot shafts to permit the disposition of said mechanism below said body, except for the protrusion of said actuating lever upwardly from the body.

2. A mechanism as claimed in claim 1 and including an arcuate ratchet member disposed to be carried by said body adjacent the actuating lever, a pawl member carried by the actuating lever and biased to engage said ratchet member to hold the actuating lever in position, and release means carried by the actuating lever for releasing the pawl member from engagement with said ratchet member to permit swinging of the actuating lever.

3. A mechanism as claimed in claim 1 in which said mower has a handle structure pivotally connected to the said body, and including spring means operatively connecting said handle structure and said actuating lever for biasing and assisting the same in a direction for lowering said supporting members and wheels carried thereby relative to said body.

4. A mechanism as claimed in claim 1 and in which said first axle shaft is axially aligned with the common axis of the forward pair of said wheels and the second axle shaft is axially aligned with the common axis of the rearward pair of said wheels.

5. A mechanism as claimed in claim 1 and in which the arm of the first pair of arms connected to said first connecting means is a bell crank and the arm of the second pair of arms connected to said second connecting means is a bell crank.

6. Linkage for changing the elevation of supporting wheels of a mower or the like relative to the body of the same, said body having a handle structure pivotally connected thereto, the forward wheels being journaled on a single front axle extending between said wheels and the rearward wheels being journaled on a single rearward axle extending between said wheels, comprising first arm means pivotally carried by said body and carrying said forward axle to raise and lower the forward axle and forward wheels carried thereby relative to said body upon swinging of said first arm means, second arm means pivotally carried by said body and carrying said rearward axle to raise and lower the rearward axle and rearward wheels carried thereby relative to said body upon swinging of said second arm means, actuating lever means pivotally carried by said body on one side of the mower and manually swingable in an arc between limits, first connecting means on said one side of the mower operatively connecting said first arm means on said one side and said actuating lever means, second connecting means operatively connecting said second arm means on said one side and said actuating lever means, said first and second connecting means being connected to the actuating lever means as to simultaneously swing the first arm means and the second arm means on said one side in directions to move, with the aid of force transmitted through said axles, the forward and rearward axles on both sides of the mower downwardly relative to the elevation of the body upon moving the actuating lever means in one direction and as to simultaneously move, with the aid of force transmitted through said axles, the forward and rearward axles on both sides of the mower upwardly relative to the elevation of the body upon moving the actuating lever means in an opposite direction, said first and second arm means and said first and second connection means being disposed substantially below a horizontal plane through the pivot axes of said arm means to permit disposition thereof below said body, and a spring operatively connecting said actuating lever means and said handle structure to provide a biased assistance to the actuating lever means toward swinging the first and second axle shafts downwardly relative to the elevation of the body.

7. Linkage as claimed in claim 6 and including releasable spring-biased detent means for retaining the said actuating lever means in predetermined position and for permitting the said actuating lever means to be swung in said arc between said limits upon release of the detent means.

8. Linkage as claimed in claim 6 and in which said first arm means comprise first arms disposed at opposite sides of the body and carried on a first shaft disposed transversely of the body, and in which said second arm means comprise second arms disposed at opposite sides of the body and carried on a second shaft disposed transversely of the body.

References Cited

UNITED STATES PATENTS

| 1,453,944 | 5/1923 | Pedroarena | 172—400 |
| 2,263,368 | 11/1941 | Sejkora | 280—43.13 |
| 2,568,822 | 9/1951 | Pervis | 280—43.13 X |
| 2,948,544 | 8/1960 | Rowe et al. | 280—43.13 |
| 2,986,402 | 5/1961 | Winton | 280—43.13 |

FOREIGN PATENTS

| 762,735 | 4/1934 | France. |

BENJAMIN HERSH, *Primary Examiner.*

C. C. PARSONS, *Assistant Examiner.*